Patented Sept. 4, 1951

2,566,861

UNITED STATES PATENT OFFICE 2,566,861

STARCH COMPOSITION

John Studeny, Stamford, Conn., assignor to American Cyanamid Company, New York, N. Y., a corporation of Maine No Drawing. Application May 5, 1948,
Serial No. 25,302

5 Claims. (Cl. 106—213)

This invention relates to converted starch adhesives and relates more particularly to converted starch adhesive and sizing compositions containing an agent serving to impart thereto greatly improved fluidity, stability, and adhesive characteristics.

The starch adhesive and sizing compositions embraced by the present invention include those which are of the directly-used type and also those of the remoistening variety. The starch adhesive compositions are those which are applied and which serve at once as adhesives between sheets of paper, wood plies, textile sheets, etc., as well as those which are applied to the surfaces of sheets of paper, textiles, and the like in film form and are then reactivated by a moistening treatment for bonding or union thereof with another material or surface. The sizing compositions are those which are suitable for application to the beater, stock chest, head box, tub press, calender, etc. in paper manufacture. Likewise, the starch compositions may be employed as binding adhesives in pigment coatings, printing pastes, and the like materials, for paper, textile, leather and other surfaces.

Ordinarily, the employment of aqueous dispersions of converted starch as adhesives or as sizing materials is attended by a two-fold disadvantage. First, the initial viscosity of the aqueous starch dispersion increases rapidly as the amount of converted starch therein is increased. For this reason, it is often impracticable to employ dispersions containing more than about 10-20% of converted starch by means of tub sizing, roll, and other commonly employed application treatments. Second, aqueous dispersions of converted starch are ordinarily quite fluid-unstable in that the materials increase in viscosity upon aging and after the lapse of a relatively short period of time become thick, unpourable hydrogels. For these reasons, it has been the ordinary practice to prepare converted starch adhesive and sizing compositions containing relatively small amounts of starch and to use these compositions as quickly as possible in order to prevent excessive waste of the materials through gelling thereof.

I have found that the addition to converted starch adhesive and sizing compositions of a small amount of a compound of the class consisting of water-soluble salts of dicyanimide imparts greatly improved initial fluidity, fluid stability during storage, and adhesive characteristics to the compositions.

The compound dicyanimide has the formula

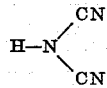

It is strongly acidic in nature, being closely analogous in this respect to thiocyanic acid. It will therefore be understood that dicyanimide reacts with strong monobasic compounds to form compounds having the general formula

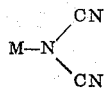

typical examples of which are ammonium dicyanimide, sodium dicyanimide, potassium dicyanimide, and the like compounds. Similarly, dicyanimide reacts with strong dibasic compounds to form the group of compounds having the formula

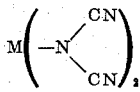

including calcium dicyanimide, barium dicyanimide, magnesium dicyanimide and the like compounds. The ammonium, alkali metal, and alkaline earth metal salts of dicyanimide form neutral aqueous solutions and are relatively stable over the pH range encountered in starch adhesives and sizes and at relatively elevated temperatures. I have discovered that these water-soluble salts of dicyanimide may be employed to reduce the initial viscosity and to improve the fluid stability of the ordinary converted starch adhesives and sizes which are obtained by chlorination, oxidation, enzyme action, and the like treatments of corn, potato, cassava, wheat, and the like starch-containing materials.

One advantage to be derived from the heat stability of my preferred dicyanimide salts is that these fluidifying agents may be added to the converted starch dispersions prior to the heat treatment ordinarily resorted to in order to develop the adhesive properties of the starch. The dicyanimide salts undergo little or no decomposition during this heat treatment and very satisfactorily reduce the initial viscosity of the starch compositions and also render them fluid-stable for relatively long periods of time.

Another advantage obtained by the present invention resides in the fact that my neutral water-soluble dicyanimide salts do not appreciably alter the pH values of the converted starch dispersions to which they are added. Thus, for example, in employing highly dextrinized starches which are ordinarily used as remoistening adhesives for paper envelopes, gummed tapes, and the like, the initial acidity of the starch compositions is maintained substantially unaltered throughout the use thereof. Such highly dextrinized starches may have initial pH values of from about 2 to about 5 and this acidity must often be maintained in order to prevent deterioration of their adhesive properties.

On the other hand, in certain other types of converted starch adhesive applications, near-neutrality or even moderate alkalinity is required. It is of equal importance that this near-neutrality or alkalinity be maintained throughout the use of these particular starch compositions. It will be seen, therefore, that my novel converted starch fluid-stabilizing agents provide a distinct advantage in fluidifying and stabilizing converted starch compositions while not appreciably changing the pH values thereof.

In practicing the invention, it is necessary only to employ fluid-stabilizing amounts of my preferred water-soluble dicyanimide salts. In the present description the term "fluid-stabilizing amount" may best be defined as the range of amounts of my novel fluidifying agents which will impart fluid-stability to converted starch dispersions while substantially maintaining the initial pH values of the dispersions. I have found that in some instances as little as 0.1% of these addition agents, based on the weight of starch present, will satisfactorily fluidify and stabilize converted starch compositions. Normally, however, the most satisfactory initial fluidity of the compositions will be obtained when from about 0.5% to about 5% of the addition agents are employed. Particularly notable is the fact that, when employing dicyanimide salts of divalent alkaline earth metals such as, for example, calcium dicyanimide, optimum fluidifying and fluid-stabilizing results are reached with about 1% of the addition agent, and the use of larger amounts is not usually necessary. On the other hand, because of their excellent water solubility it is possible when desired to employ amounts of my addition agents up to 20-30% of the weight of the starch present in the dispersions, and the use of even these large amounts does not materially change the pH thereof. It will thus be seen that quantities as small as 0.1% and as large as 20-30%, based on the dry weight of the converted starch, are indicated by the term "fluid-stabilizing amount" as used in the present specification and claims.

Inasmuch as my novel fluid-stabilized converted starch compositions are initially much less viscous than those which have heretofore been employed in the art, it will be seen that the quantities of starch which it is possible to incorporate in paper, leather, textiles, etc. may be increased without seriously interfering with the commonly employed methods of applying such adhesives and sizing compositions thereto. This is particularly important where the converted starch compositions are to be used in conjunction with the addition of various pigments and other fillers to paper, etc. In such uses, it will be readily understood that because of the fluidifying action of the addition agents of the invention, the total solids content of the coating compositions may be increased while maintaining the desirable viscosity and flow characteristics thereof. I am thus enabled to obtain substantial economies in drying the coated paper, while at the same time reducing undesirable penetration of the coating material into the base sheet.

The invention will be more thoroughly explained by the following illustrative examples.

*Example 1*

60 grams of a commercial oxidized corn starch were added to 240 grams of demineralized water. 3 grams of ammonium dicyanimide were added to this aqueous starch dispersion. The mixture was heated with frequent stirring to 190° F., and was maintained at this temperature for 15 minutes. The material was thereafter cooled and set aside for periodic viscosity and pH tests, the viscosity determinations being made with a Brookfield viscosimeter at 60 R. P. M. A control sample was also prepared according ot the above described procedure, except that no fluidifying agent was added. The results are recorded in the table of Example 3.

*Example 2*

The procedure of Example 1 was repeated except that 3 grams of sodium dicyanimide was employed as the fluidifying agent.

*Example 3*

The procedure of Example 1 was repeated except that 3 grams of calcium dicyanimide was employed as the fluidifying agent.

| Example No. | Brookfield Viscosity in cp., Aging Time in Hours | | | | | pH Range | Condition of Aged Materials |
|---|---|---|---|---|---|---|---|
| | 2 | 27 | 46 | 74 | 140 | | |
| Control | 856 | 1,525 | 1,720 | 2,020 | 2,650 | 6.77-6.95 | Semi-solid gel. |
| 1 | 696 | 932 | 964 | 1,020 | 996 | 6.42-6.73 | Fluid. |
| 2 | 632 | 832 | 876 | 888 | 1,024 | 6.45-6.88 | Do. |
| 3 | 168 | 252 | 268 | 300 | 424 | 6.80-6.94 | Do. |

*Example 4*

Five starch dispersions were prepared by mixing in each instance 60 grams of a commercial oxidized corn starch with 240 grams of demineralized water. One sample remained untreated, while to the remaining four dispersions were added 1% respectively of ammonium dicyanimide, sodium dicyanimide, calcium dicyanimide, and barium dicyanimide, all percentages being based upon the oven-dry starch solids. All of the samples were then heated on a water bath to 190° F., maintained at this temperature for 15 minutes and then allowed to cool. The samples were then set aside for periodic viscosity and pH tests as in Example 1. Test results are as follows.

| Fluidifying Agent Employed | Brookfield Viscosity in cp., Aging Time in Hours | | | | pH Range | Appearance of Aged Materials |
|---|---|---|---|---|---|---|
| | 3 | 22 | 46 | 94 | | |
| Control, none | 1,192 | 1,960 | 2,220 | 3,300 | 6.95-7.05 | Solid gel. |
| 1% Ammonium dicyanimide | 1,284 | 1,760 | 2,140 | 2,700 | 6.84-6.96 | Fluid. |
| 1% Sodium dicyanimide | 1,080 | 1,512 | 1,780 | 2,220 | 7.14-7.18 | Do. |
| 1% Calcium dicyanimide | 564 | 952 | 1,192 | 2,000 | 6.83-7.01 | Do. |
| 1% Barium dicyanimide | 820 | 1,212 | 1,412 | 2,160 | 6.95-6.98 | Do. |

Example 5

The procedure of Example 4 was repeated except that the four dispersions contained 0%, 0.1%, 0.5% and 1.0% of calcium dicyanimide as the fluidifying agent. The following test results were obtained. In this experiment the pH of the control dispersion varied from 6.7 to 7.1 and the dispersions containing the fluidifying agent also stayed within this range.

| Fluidifying Agent Employed | Initial | Brookfield Viscosity in cp., Aging Time in Hours | | | | |
|---|---|---|---|---|---|---|
| | | 20 | 43 | 67.5 | 91.5 | 187.5 |
| Control, none | 828 | 1,572 | 2,200 | 2,660 | 3,220 | Solid gel. |
| 0.1% Calcium dicyanimide | 488 | 900 | 1,260 | 1,600 | 1,900 | Fluid. |
| 0.5% Calcium dicyanimide | 256 | 536 | 692 | 1,128 | 1,640 | Do. |
| 1.0% Calcium dicyanimide | 176 | 344 | 468 | 836 | 1,420 | Do. |

It will be seen from the above illustrative examples that the present invention provides converted starch compositions having initial viscosities which are much lower than those which have heretofore been obtained by the art and which, in addition, maintain fluid stability throughout a relatively long storage period. The present invention also permits the use of increased solids contents in adhesive and sizing compositions.

In some instances, it may be advantageous to compound our fluid-stabilizing converted starch compositions with other fluidifying agents and with various plasticizing agents. In this respect urea and the like fluidifying agents, and such plasticizers as glycerol, ethylene glycol and other polyhydric alcohols or their equivalents may be compounded with my novel converted starch compositions to obtain dried sizing films which are characterized by their improved pliability. Likewise, my novel fluid-stabilizing starch compositions may be blended in all proportions with other commonly employed sizing materials such as wax sizes, glue, casein, water-soluble resins and cellulose derivatives and various emulsions, as well as with fire proofing, mildew proofing, and the like agents.

What I claim is:

1. A fluid-stable converted starch normally tending to gel when prepared with plain water and allowed to stand but transformed under similar conditions of treatment to substantial fluid-stability by the presence therein of a fluid-stabilizing amount of a member of the group consisting of water-soluble ammonium, alkali metal, and alkaline earth metal salts of dicyanimide.

2. A composition of matter as in claim 1, wherein the fluid-stabilizing agent is sodium dicyanimide.

3. A composition of matter as in claim 1, wherein the fluid-stabilizing agent is ammonium dicyanimide.

4. A composition of matter as in claim 1, wherein the fluid-stabilizing agent is calcium dicyanimide.

5. A fluid-stable converted starch consisting essentially of converted starch together with 0.1% to 30% of its weight of a fluid stabilizing agent selected from the group consisting of water-soluble ammonium, alkali metal, and alkaline earth metal salts of dicyanimide.

JOHN STUDENY.

REFERENCES CITED

The following references are of record in the file of this patent:

UNITED STATES PATENTS

| Number | Name | Date |
|---|---|---|
| 2,170,271 | Walsh | Aug. 27, 1939 |
| 2,282,364 | Kunze et al. | May 12, 1942 |
| 2,320,225 | Ericks | May 25, 1943 |
| 2,371,100 | Kaiser et al. | Mar. 6, 1945 |

OTHER REFERENCES

Kerr: "Chemistry and Industry of Starch," 1944, pages 57, 448 and 449.